(12) United States Patent
Liu et al.

(10) Patent No.: US 10,712,572 B1
(45) Date of Patent: Jul. 14, 2020

(54) ANGLE SENSITIVE PIXEL ARRAY INCLUDING A LIQUID CRYSTAL LAYER

(71) Applicant: Facebook Technologies, LLC, Menlo Park, CA (US)

(72) Inventors: Xinqiao Liu, Medina, WA (US); Yijing Fu, Redmond, WA (US); Lu Lu, Seattle, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 60 days.

(21) Appl. No.: 15/670,532

(22) Filed: Aug. 7, 2017

Related U.S. Application Data

(60) Provisional application No. 62/414,250, filed on Oct. 28, 2016.

(51) Int. Cl.
| | | |
|---|---|---|
| *G09G 5/12* | (2006.01) | |
| *G02B 27/01* | (2006.01) | |
| *G02B 13/00* | (2006.01) | |
| *G02B 27/00* | (2006.01) | |
| *G02B 3/00* | (2006.01) | |
| *G02B 5/20* | (2006.01) | |
| *G06T 1/20* | (2006.01) | |
| *G06T 3/40* | (2006.01) | |
| *G06T 7/557* | (2017.01) | |
| *G06T 7/70* | (2017.01) | |
| *H04N 5/225* | (2006.01) | |
| *H04N 5/247* | (2006.01) | |
| *G06F 1/16* | (2006.01) | |

(52) U.S. Cl.
CPC ....... *G02B 27/0176* (2013.01); *G02B 3/0006* (2013.01); *G02B 5/208* (2013.01); *G02B 13/0015* (2013.01); *G02B 13/0085* (2013.01); *G02B 27/0025* (2013.01); *G02B 27/017* (2013.01); *G06F 1/163* (2013.01); *G06T 1/20* (2013.01); *G06T 3/4053* (2013.01); *G06T 7/557* (2017.01); *G06T 7/70* (2017.01); *H04N 5/2253* (2013.01); *H04N 5/247* (2013.01)

(58) Field of Classification Search
CPC .. G02B 27/017; G02B 2027/014; G09G 5/12; G09G 5/14; G09G 5/377; G09G 2370/16; G09G 2370/022; G09G 2330/021; G09G 5/006; G09G 2340/0435; G09G 5/00
See application file for complete search history.

(56) References Cited

U.S. PATENT DOCUMENTS 8,411,235 B1 * 4/2013 Barnidge ............... G02B 27/22
349/112
9,654,683 B2 * 5/2017 Xu ........................ H04N 13/232
(Continued)

*Primary Examiner* — Olga V Merkoulova
(74) *Attorney, Agent, or Firm* — Fenwick & West LLP

(57) ABSTRACT

A light field camera capturing one or more light field frames including intensity and angle information of received light. The light field camera includes an array of pixels, a liquid crystal layer overlaying the array of pixels, and a controller. The controller controls, at each time instant, one or more voltages applied to the liquid crystal layer. The controller adjusts, based on the one or more voltages, the liquid crystal layer to control amounts of light at one or more angles transmitted through the liquid crystal layer and captured by the array of pixels as a light field frame. The controller can determine depth information based on the captured one or more light field frames.

20 Claims, 6 Drawing Sheets

(56) References Cited

U.S. PATENT DOCUMENTS

| | | | |
|---|---|---|---|
| 2005/0225877 A1* | 10/2005 | Tang | G02F 1/29 359/721 |
| 2006/0028400 A1* | 2/2006 | Lapstun | G02B 26/06 345/8 |
| 2006/0192869 A1* | 8/2006 | Yoshino | H04N 13/225 348/294 |
| 2012/0007898 A1* | 1/2012 | Pavicic | G09G 3/32 345/690 |
| 2013/0050070 A1* | 2/2013 | Lewis | A61B 3/113 345/156 |
| 2014/0285708 A1* | 9/2014 | Kwon | H01L 27/14625 348/360 |
| 2015/0070536 A1* | 3/2015 | Sasaki | H04N 5/367 348/246 |
| 2016/0139402 A1* | 5/2016 | Lapstun | G02B 6/34 349/193 |
| 2016/0227085 A1* | 8/2016 | Xu | H04N 5/225 |
| 2016/0241840 A1* | 8/2016 | Kim | G02B 27/0075 |
| 2016/0313558 A1* | 10/2016 | Gutierrez | G09G 3/02 |
| 2017/0118397 A1* | 4/2017 | Chang | H04N 5/23232 |

\* cited by examiner

ANGLE SENSITIVE PIXEL ARRAY INCLUDING A LIQUID CRYSTAL LAYER

CROSS REFERENCE TO RELATED APPLICATION

This application claims priority to U.S. Application No. 62/414,250, filed Oct. 28, 2016, which is incorporated herein by reference in its entirety.

BACKGROUND

The present disclosure generally relates to capturing devices or cameras used in virtual reality (VR), augmented reality (AR) and mixed reality (MR) systems, and specifically relates to implementation of light field cameras using an angle sensitive pixel array that includes a liquid crystal layer.

A light field camera captures information about a light field emanating from a scene, i.e., the light field camera captures information about intensity of light reflected from the scene and information about angles of light rays reflected from the scene. In contrast, a conventional camera captures only light intensity. Light field cameras can be used in VR, AR and MR systems for, for example, three-dimensional (3D) or depth estimation of objects in a scene, and for eye tracking. Typically, a light field camera employs an array of micro-lenses placed in front of a conventional image sensor or pixel array for sensing intensity, color and directional (angle) information. However, implementation of a light field camera based on an array of micro-lenses does not provide flexibility in controlling an amount of light that propagates the array of micro-lenses at a given angle. This is because an array of micro-lenses passes light having particular angular direction(s), wherein light rays that propagate in other angular directions are not passed through the array of micro-lenses and information about these angular directions is lost. In addition, flexibility in controlling amounts of light that reach a pixel array of a light field camera at different angles require micro-lens arrays of different orientations to overlay the pixel array. Therefore, it is desirable to achieve more flexible implementation of a light field camera.

SUMMARY

A light field camera with an angle sensitive pixel (ASP) array configured to capture one or more light field frames including intensity and angle information of light received by the ASP array. The ASP array includes an array of pixels and a liquid crystal layer overlaying the array of pixels. A controller coupled to the ASP array controls, at each time instant of one or more time instants, one or more voltage levels applied to the liquid crystal layer. The controller adjusts, based on the one or more voltage levels, the liquid crystal layer to control amounts of light at one or more defined angles transmitted through the liquid crystal layer and captured by the array of pixels as a light field frame of the one or more light field frames. The array of pixels captures, during the one or more time instants, the one or more light field frames. In some embodiments, the controller can determine depth information based on the captured one or more light field frames.

A head-mounted display (HMD) can further integrate the light field camera. The HMD further includes an electronic display and an optical assembly. The HMD may be, e.g., a virtual reality (VR) system, an augmented reality (AR) system, a mixed reality (MR) system, or some combination thereof. The electronic display is configured to emit image light. In some embodiments, the optical assembly is configured to direct the image light to an exit pupil of the HMD corresponding to a location of a user's eye, the image light comprising the depth information of one or more objects in a local area surrounding some or all of the HMD determined by the light field camera. In alternate embodiments, the controller of the light field camera determines a position of an eye of a user wearing the HMD, based on the depth information and a virtual eye model.

Figure 1:
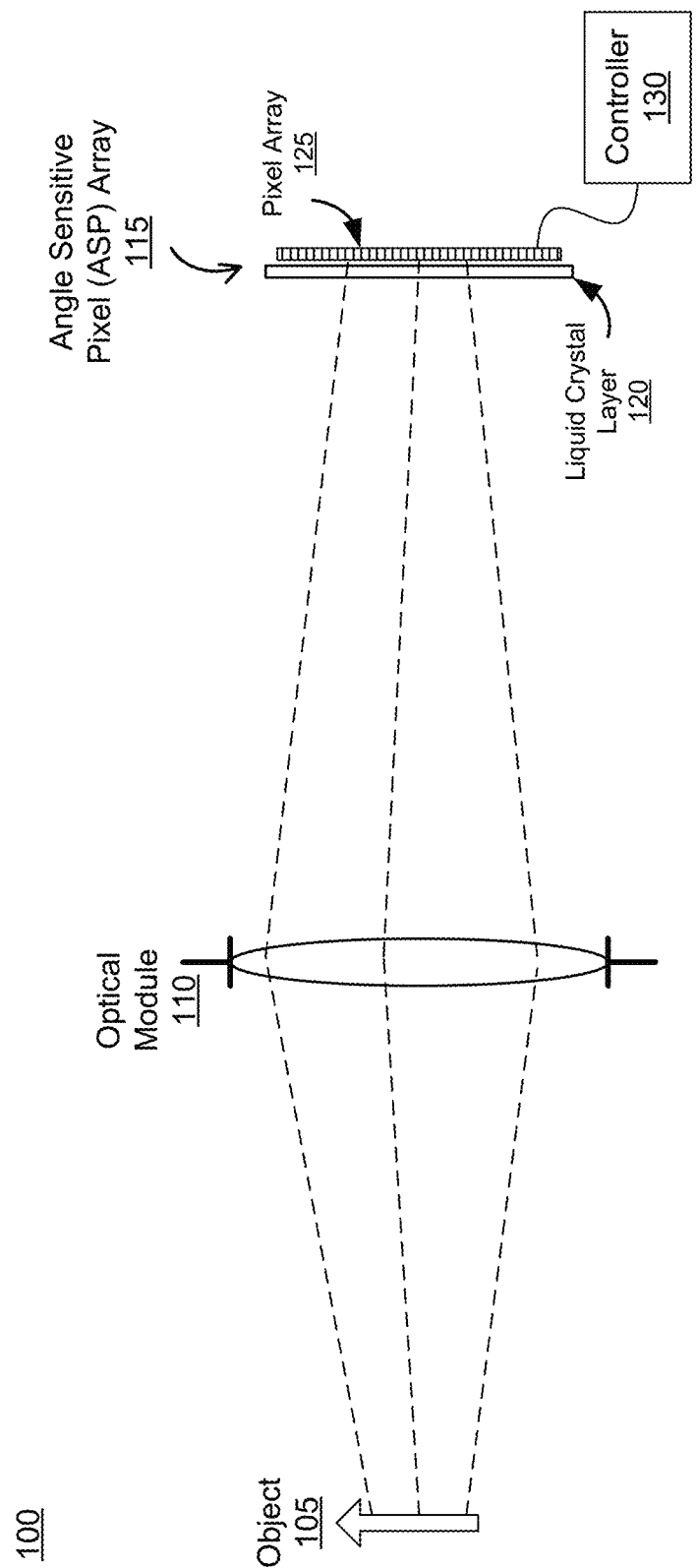
FIG. 1 is a diagram of a light field camera including an ASP array, in accordance with an embodiment.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

A light field camera includes an angle sensitive pixel (ASP) array. The ASP array records intensity and angle information of received light. Instead of an array of micro-lenses, the ASP array includes a liquid crystal layer that overlays a pixel array. The liquid crystal layer includes one or more liquid crystal cells. Each liquid crystal cell may be individually adjusted to control an amount of light at a given angle that is transmitted through the liquid crystal cell to the pixel array. In this manner, the one or more liquid crystal cells determine what angle information for received light is collected by the pixels they overlay. In some embodiments, the light field camera including the ASP array can be used for depth determination, eye tracking, etc., in a head-mounted display (HMD).

The light filed camera captures information about intensity and angle information for one or more objects in a field of view of the light field camera. In one embodiment, the light field camera can be used for determining depth of a scene. In another embodiment, the light field camera can be used for eye tracking. The light reflected from the one or more objects is captured by the light field camera. At a time instant, the light field camera records information about intensity and angle of the reflected light that is received at the light field camera. A liquid crystal of the light field camera is controlled by a defined level of voltage applied at the liquid crystal. At one or more later time instants, the light field camera records information about intensity and one or more different angular directions of the reflected light. The one or more liquid crystal cells of the liquid crystal layer are controlled by one or more different levels of the voltage applied to the one or more liquid crystal cells. The light field camera obtains information about multiple light fields emanating from a scene in a field of view of the light field camera, based on the intensity and angle information of the received light previously recorded. The light fields comprise information about intensities and angles of light received at the light field camera over multiple time instants. The HMD can determine, based on the light fields, depth of the one or more objects located in the field of view of the light field camera, from where the light captured by the light field camera was reflected. The HMD can also determine and track, based on the light fields, a position of the user's eye as light captured by the light field camera was reflected from at least one surface of the user's eye. Note that information about position of an eye also include information about an orientation of an eye, i.e., information about eye gaze.

Disclosed embodiments include implementation of a light field camera with a liquid crystal layer that overlays an array of detectors or pixels to form an ASP array. In some embodiments, the light field camera using the ASP array that includes the liquid crystal layer can be used for depth estimation, eye tracking, etc. in a HMD. The HMD may be part of, e.g., a virtual reality (VR) system, an augmented reality (AR) system, a mixed reality (MR) system, or some combination thereof.

Light Field Camera with Angle Sensitive Pixel Array that Includes Liquid Crystal Layer FIG. 1 is a diagram of a light field camera 100 that includes an ASP array 115, in accordance with an embodiment. As illustrated in FIG. 1, the light field camera 100 captures an image of an object 105. The light field camera 100 includes an image-forming optical module 110, which in FIG. 1 is represented by a single lens element although it is understood that the optical module 110 could contain multiple elements and/or non-lens elements (e.g., mirrors). The ASP array 115 captures an optical image of the object 105 in the form of one or more light field frames. The ASP array 115 records both intensity and angle information of received light reflected from the object 105. As illustrated in FIG. 1, the ASP array 115 includes a liquid crystal layer 120 that overlays a pixel array 125. A controller 130 coupled to the ASP array 115 collects the data from the detector array 115 and processes it accordingly. In addition, the controller 130 may control operation of the liquid crystal layer 120. In some embodiments, the controller 130 controls one or more voltages applied to the liquid crystal layer 120, which further controls an amount of light at one or more angles propagating through the liquid crystal layer 120 toward the pixel array 125.

In some embodiments, the light field camera 100 can be implemented in an HMD, which may be part of, e.g., a VR system, an AR system, a MR system, or some combination thereof. In one embodiment, the light field camera 100 implemented at the HMD can be used for determining depth information for a scene in a field of view of the HMD. In the illustrative embodiment shown in FIG. 1, the light field camera 100 can be used for determining depth information for the object 105. More details about usage of the light field camera 100 for determining depth information are disclosed herein in relation to FIGS. 4-5. In another embodiment, the light field camera 100 implemented at the HMD can be used for eye tracking. More details about usage of the light field camera 100 for eye tracking are disclosed herein in relation to FIG. 6.

Figure 2A:
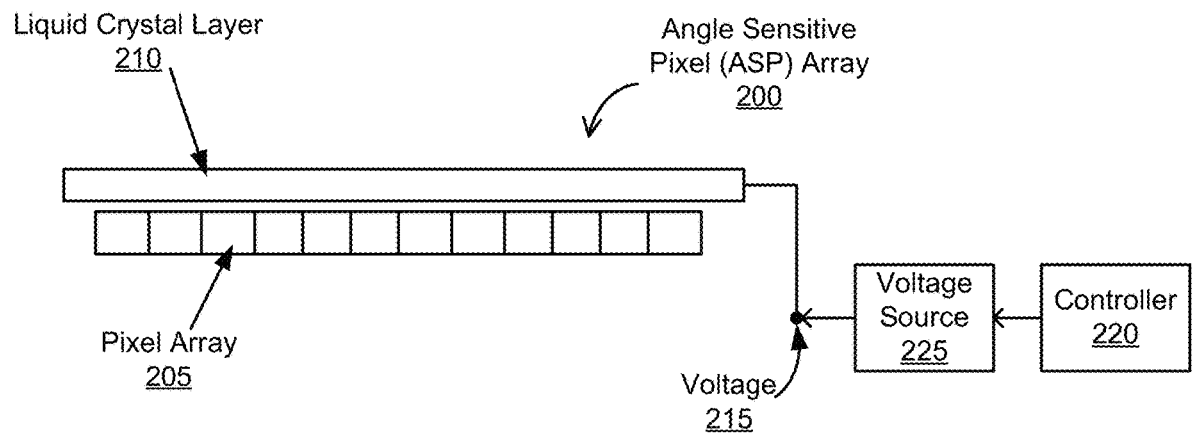
FIG. 2A is an example implementation of a portion of a light field camera that includes an ASP array, in accordance with an embodiment.

FIG. 2A illustrates an example implementation of a portion of a light field camera that includes an ASP array 200, in accordance with an embodiment. The ASP array 200 may be an embodiment of the ASP array 115 of the light field camera 100 shown in FIG. 1. As illustrated in FIG. 2A, the ASP array 200 comprises an array of pixels 205 and a liquid crystal layer 210 that overlays the pixel array 205 to form the ASP array 200 providing angle sensitivity for the light field camera. The ASP array 200 captures and records both intensity and angle information of light received at the pixel array 205. The liquid crystal layer 210 that provides angle sensitivity for the light field camera comprises one or more liquid crystal cells. In one embodiment shown in FIG. 2A, the liquid crystal layer 210 comprises a single liquid crystal cell that covers the entire pixel array 205. In another embodiment (not shown in FIG. 2A), the liquid crystal layer 210 comprises a plurality of liquid crystal cells, and each liquid crystal cell covers a portion of the pixel array 205. In yet another embodiment (not shown in FIG. 2A), each liquid crystal cell of a plurality of liquid crystal cells in the liquid crystal layer 210 covers a single pixel in the pixel array 205.

An orientation of liquid crystal molecules in each liquid crystal cell of the liquid crystal layer 210 and thus angle sensitivity of that liquid crystal cell can be dynamically changed based on an electrical field that flows through that liquid crystal cell, which depends on a level of voltage applied to that liquid crystal cell. In one embodiment illustrated in FIG. 2A, a voltage 215 is applied to the liquid crystal layer 210 having a single liquid crystal cell. Thus, an orientation of liquid crystal molecules in the single liquid crystal cell in the liquid crystal layer 210 is based on a level of voltage 215. Herein, the liquid crystal layer 210 controls, based on the applied voltage 215, an amount of light at a given angle that propagates through the liquid crystal layer 210 and passes to the pixel array 205 to be captured and recorded. In the configuration shown in FIG. 2A, all pixels in the pixel array 205 capture the same angle information at a time, based on a level of voltage 215 applied to the liquid crystal layer 210. Different orientation of the cell in the liquid crystal layer 210 and thus different angle sensitivity can be achieved at some other time instant by applying a different level of voltage 215. This represents a time multiplexed operation of a light field camera comprising the ASP array 200. In the embodiment shown in FIG. 2A, a controller 220 coupled to a voltage source 225 interfaced to the liquid crystal layer 210 controls a level of voltage 215 applied to the liquid crystal cell 210 at a specific time instant. In this manner, the controller 225 dynamically controls what angle information for received light is detected by the pixel array 205 at a particular time instant.

In another embodiment, a plurality of voltage sources (not shown in FIG. 2A) operated by the controller 220 can be coupled to the liquid crystal layer 210, wherein each voltage source controls orientation of liquid crystal molecules and angular sensitivity of one liquid crystal cell of a plurality of cells in the liquid crystal layer 210. In this case, different portions of the pixel array 205 capture different angles of received light, wherein each portion of the pixel array is overlaid by a different liquid crystal cell controlled by a different voltage source. This represents a spatial multiplexed operation of a light field camera. For the spatial multiplexed operation, a single frame of light signals is captured at a time instant by the pixel array 205 that covers multiple angles of received light. In this case, different portions of pixels in the pixel array 205 capture different angle information at a particular time instant.

In a special case, each pixel in the pixel array 205 can be overlaid by a liquid crystal cell individually controlled by a voltage source. In an illustrative embodiment, the pixel array 205 can be divided into groups of macro-pixels, where each macro-pixel is, for example, a 100×100 grid of pixels. Then, the angular sensitivity may vary for each of the pixels within the macro-pixels, but would vary in a manner that is the same for each macro-pixel. Accordingly, where a macro-pixel is a N×N array of pixels in x and y dimensions, in a $(x_n,y_n)$ position of each macro-pixel angle information would be the same. In other words, for a given time, angular sensitivity of corresponding positions in different macro-pixels is the same.

Figure 2B:
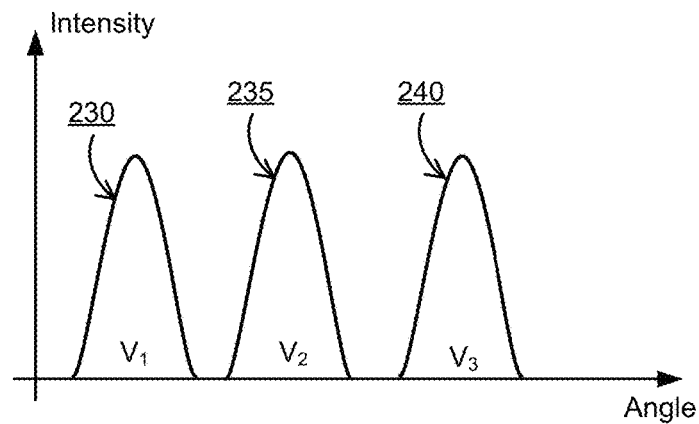
FIG. 2B is an example graph of a light signal intensity captured by the light field camera in FIG. 2A as a function of angle of received light for different voltages applied at a liquid crystal of the light field camera, in accordance with an embodiment.

FIG. 2B illustrates an example graph of light signal intensities captured and recorded by the ASP array 200 of a light field camera as a function of angle of received light for different levels of voltages applied at the liquid crystal layer 210, in accordance with an embodiment. In an illustrative embodiment, the liquid crystal layer 210 has particular design orientations and thickness to provide light intensity responses for different applied voltages as shown in FIG. 2B. In one embodiment, the liquid crystal layer 210 comprises a single liquid crystal cell that overlays the entire pixel array, as shown in FIG. 2A. Plots 230, 235 and 240 show intensities of light signals received and captured by pixels overlaid with the liquid crystal cell for different angular directions of received light for three different levels of voltage 215 applied to the liquid crystal cell at three different time instants, i.e., voltage levels $V_1$, $V_2$, $V_3$ of voltage 215 are applied sequentially. It can be observed from each of the plots 230, 235 and 240 that a highest intensity of received light signal (peak response) corresponds to a certain specific angle of received light, and that an intensity of received and detected light sharply decreases for other angles of light that reach the liquid crystal cell. Thus, upon applying a certain level of voltage 215 to the liquid crystal cell of the liquid crystal layer 210, the pixels overlaid with the liquid crystal cell captures intensity of received light for one particular angle or a narrow range of angular directions, which depends on the level of voltage 215 applied to the liquid crystal cell.

For the time multiplexed operation of a light field camera, the controller 220 instructs the voltage source 225 to sequentially change levels of voltage 215 applied to the liquid crystal cell over a plurality of time instants. Then, the pixel array 205 captures intensity information of light coming to the liquid crystal layer 210 for different angular directions of received light during the plurality of time instants. Thus, the controller 220 scans the liquid crystal layer 210 during multiple time instants to propagate received light of different angular directions. In the illustrative embodiment shown in FIG. 2B, the controller 220 instructs the voltage source 225 to apply voltage 215 of level $V_1$ at a time instant $T_1$, to apply voltage 215 of level $V_2$ at a later time instant $T_2$, and to apply voltage 215 of level $V_3$ at even later time instant $T_3$. Then, the ASP array 200 records angle information of received light for three different angular directions of light rays received at the pixel array 205 during three different time instants.

In another embodiment related to the spatial multiplexed operation of a light field camera, the liquid crystal layer 210 comprises a plurality of liquid crystal cells that overlay different sub-groups of pixels in the pixel array 205. Thus, pixels in the pixel array 205 are divided up into sub-groups that capture information at different angles of received light. In this embodiment, the controller 220 instructs, at a time instant, multiple voltage sources to apply different voltages to different liquid crystal cells of the liquid crystal layer 210. Then, the plots 230, 235 and 240 shown in FIG. 2B represent light intensity responses for three different sub-groups of pixels in the pixel array 205 for three different voltages $V_1$, $V_2$ and $V_3$ applied to the liquid crystal cells that overlay the sub-groups of pixels. By employing the spatial multiplexed operation, scanning of the liquid crystal layer 210 for different angle information can be faster compared to the time multiplexed operation.

Figure 2C:
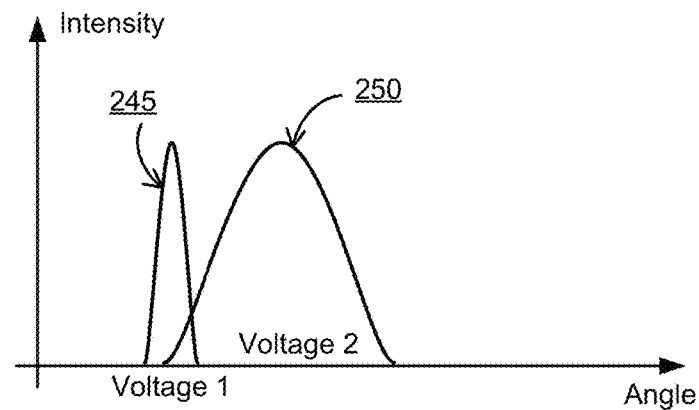
FIG. 2C is an example graph showing different angle bandwidths of light received at the light field camera in FIG. 2A for different voltages applied at a liquid crystal of the light field camera, in accordance with an embodiment.

FIG. 2C is an example graph showing different angle bandwidths of light received at the ASP array 200 for different levels of voltage 215 applied at the liquid crystal layer 210 comprising a single liquid crystal cell, in accordance with an embodiment. In some embodiments, the liquid crystal cell can be designed such that to detect different angular bandwidths of received light for different levels of voltage 215 applied at the liquid crystal cell. Therefore, the liquid crystal cell can be configured as an angular bandwidth filter. As illustrated by intensity graph 245 in FIG. 2C, for a first level of voltage 215 (e.g., Voltage 1), a bandwidth of angular directions of received light captured and recorded by the ASP array 200 is relatively narrow. When a second level of voltage 215 (e.g., Voltage 2) is applied at the liquid crystal cell, a bandwidth of angular directions of received light captured and recorded by the ASP array 200 is relatively wide, as illustrated by intensity graph 250 in FIG. 2C. Thus, when the first level of voltage 215 is applied to the liquid crystal cell, the ASP array 200 records information about only a specific angle of received light, which provides higher angular resolution. In contrast, when the second level of voltage 215 is applied to the liquid crystal cell, the ASP array 200 records information about a wider range of angles of received light, which may provide, e.g., an improved level of motion blur.

In some embodiments, the angular bandwidth affects the accuracy of the object depth estimation. A narrower angular bandwidth illustrated by the intensity graph 245 in FIG. 2C provides more angular sampling points, and hence more accurate depth estimation if an intensity of light is high enough at each sampling point, i.e., greater than a pre-defined threshold. On the other hand, a wider angular bandwidth illustrated by the intensity graph 250 in FIG. 2C provides less angular samples, but the wider angular bandwidth may allow more light to pass through at each sampling point.

In some embodiments, the liquid crystal layer 210 shown in FIG. 2A may comprise one or more mono-domain vertically aligned (VA) liquid crystal cells that have very strong angular dependence. A configuration can be considered herein where a VA liquid crystal cell of the liquid crystal layer 210 is placed between two crossed polarizers (not shown in FIG. 2A). At OFF state of an electrical field applied to the VA liquid crystal cell, a liquid crystal molecular is vertically aligned to a substrate, and no light can pass after the crossed polarizers. When the electrical field is applied to the VA liquid crystal cell, the liquid crystal starts to rotate in accordance with the electric field. The transmission of light is maximized at an angle perpendicular to a liquid crystal director direction. In contrast, the transmission of light is minimized at an angle parallel to the liquid crystal director direction. When different driving voltages are applied across the substrate (e.g., voltages $V_1$, $V_2$, $V_3$ as shown in FIG. 2B), a maximum light transmission angle can be tuned for different electrical fields resulting from different driving voltages. In order to achieve a wider angular bandwidth illustrated by the intensity graph 250 in FIG. 2C, two designs can be implemented. In one embodiment, a mono-domain VA liquid crystal layer can be stacked to a multi-domain VA liquid crystal layer to form the liquid crystal layer 210 shown in FIG. 2A. In another embodiment, two mono-domain VA liquid crystal layers having opposite pre-tilting angles can be stacked to each other forming the liquid crystal layer 210 shown in FIG. 2A.

In some embodiments, a maximum resolution in angular direction of light that can be obtained based on the design presented herein is approximately 1 degree. For example, the 1-degree resolution of angular direction (i.e., step in each angular orientation configuration) can be achieved with special liquid crystal cell designs. In some embodiments, a preferred range for capturing angle information in a light field camera is around 10 degrees or more.

Figure 3:
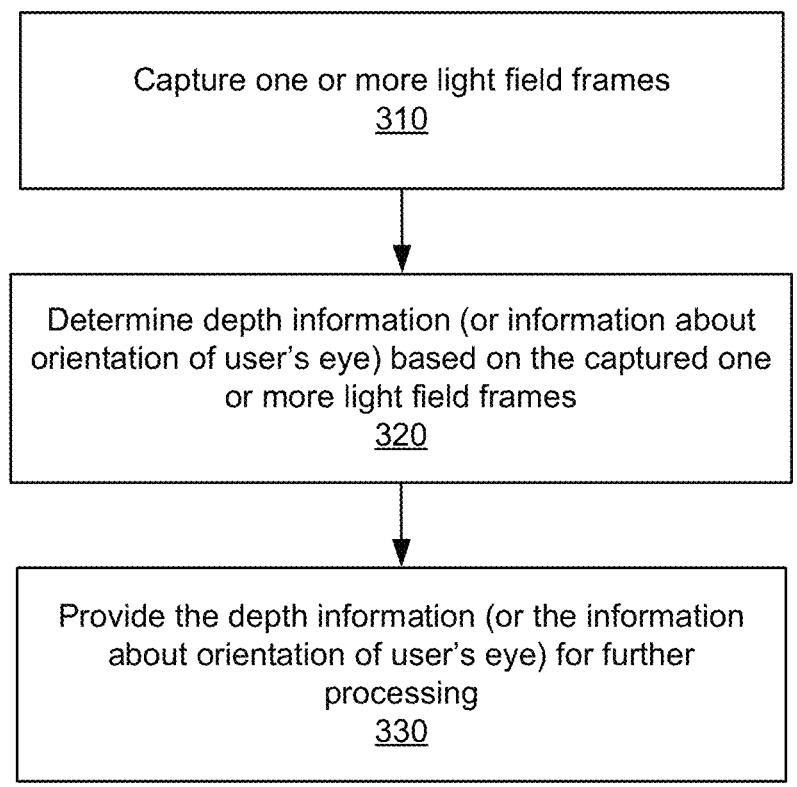
FIG. 3 is a flow chart illustrating a process of utilizing a light field camera including an ASP array to determine depth information, in accordance with an embodiment.

FIG. 3 is a flow chart illustrating a process 300 of utilizing a light field camera including an ASP array to determine depth information, in accordance with an embodiment. The process 300 of FIG. 3 may be performed by a light field camera, such as the light field camera 100 in FIG. 1, and by components of the light field camera, such as the components shown in FIG. 2A. In some embodiments, the light field camera may be part of an HMD. Other entities may perform some or all of the steps of the process in other embodiments. Likewise, embodiments may include different and/or additional steps, or perform the steps in different orders.

The light field camera captures 310 (e.g., via the ASP array 200 shown in FIG. 2A) one or more light field frames, i.e., intensity and angle information of received light. In one embodiment, the light field camera captures 310 a plurality of light field frames during a plurality of time instants, which corresponds to the aforementioned time multiplexed operation of the light field camera. In another embodiment, the light field camera captures 310 a light field frame at a time instant that comprises information about multiple different angles of the received light, which corresponds to the aforementioned spatial multiplexed operation of the light field camera. A liquid crystal layer of the light field camera selectively transmits a portion of the received light based in part on (1) one or more voltage levels applied to the liquid crystal layer and (2) an angle of incidence of the received light with the liquid crystal layer.

In one embodiment, the light field camera captures 310 the one or more light field frames that represent one or more images of an area in a field of view of the HMD. In this case, the light field camera is configured in the HMD for determining depth of a scene. In an alternate embodiment, the light field camera captures 310 the one or more light field frames that represent one or more captured images of an eye of a user wearing the HMD with the light field camera. In this case, the light field camera is configured in the HMD for eye tracking.

The light field camera determines 320 depth information (or, alternatively, information about a position of the user's eye) based on the captured one or more light field frames. The way depth information can be extracted from the light field frames can be best understood when considering an illustrative embodiment where only two angular samples (i.e., two angular directions of light) are captured by the light field camera. When an angle of light input into the ASP array is tuned to a first angular direction, a first focused image of an object in a field of view of the light field camera will fall on one particular side of the pixel array determined by the first angular direction of the input light. When an angle of light input into the ASP array is tuned to a second angular direction different than the first angular direction, a second focused image of the object will fall on a different side of the pixel array determined by the second angular direction of the input light. A stereo image pair is obtained based on combining the first focused image and the second focused image captured by the ASP array. The depth information can be calculated from a baseline separation (i.e., an aperture size of a main lens in the light field camera) and a displacement between the first focused image and the second focused image. In some embodiments, when more than two angular samples (i.e., angular directions of light) are captured by the light field camera, multiple images of the object captured by the ASP array represent the object as imaged from multiple angles. This makes the correspondence matching easier and the depth estimation more accurate in comparison with the case where only two angular directions are sampled.

The light field camera provides 330 the depth information (or, alternatively, the information about position of the user's eye) for further processing. In one embodiment, the light field camera provides 330 the depth information to a console or the HMD to assist in scene rendering. In another embodiment, the light field camera provides 330 the information about orientation of the user's eye to a module of the HMD for determining position of the user's eye and eye gaze. The HMD may determine a position of the user's eye, based on the depth information and a virtual eye model. In yet another embodiment, the light field camera can be used to measure the bidirectional reflectance distribution function (BRDF) of an object in a field of view of the light field camera. The BRDF represents a function that defines how light is reflected at an opaque surface of the object. The BRDF is a radiometric concept that can be applied in computer graphics for photorealistic rendering of synthetic scenes. Furthermore, the BRDF concept can be applied in computer vision applications for solving inverse problems such as object recognition. In addition, the BRDF concept can be used for modeling low concentration solar photovoltaic systems.

System Environment

Figure 4:
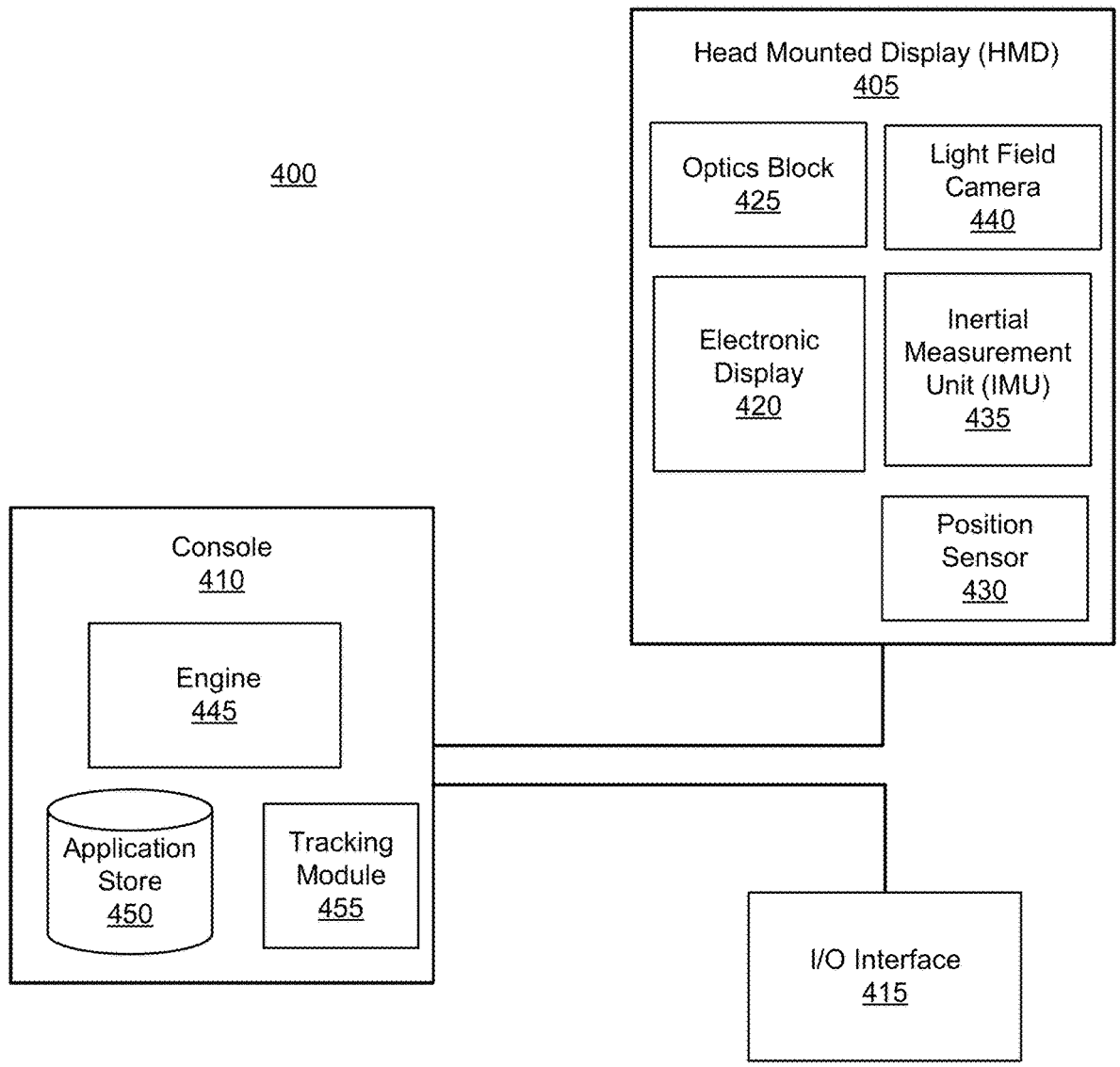
FIG. 4 is a block diagram of a system environment in which the light field camera in FIG. 1 may be included, in accordance with an embodiment.

FIG. 4 is a block diagram of one embodiment of a system environment 400 in which a console 410 operates. The system 400 may operate in a VR system environment, an AR system environment, a MR system environment, or some combination thereof. The system environment 400 shown by FIG. 4 comprises an HMD 405 and an input/output (I/O) interface 415 that is coupled to the console 410. While FIG. 4 shows an example system 400 including one HMD 405 and on I/O interface 415, in other embodiments any number of these components may be included in the system environment 400. For example, there may be multiple HMDs 405 each having an associated I/O interface 415, with each HMD 405 and I/O interface 415 communicating with the console 410. In alternative configurations, different and/or additional components may be included in the system environment 400. Additionally, functionality described in conjunction with one or more of the components shown in FIG. 4 may be distributed among the components in a different manner than described in conjunction with FIG. 4 in some embodiments. For example, some or all of the functionality of the console 410 is provided by the HMD 405.

The HMD 405 is a head-mounted display that presents content to a user comprising virtual and/or augmented views of a physical, real-world environment with computer-generated elements (e.g., two dimensional (2D) or three dimensional (3D) images, 2D or 3D video, sound, etc.). In some embodiments, the presented content includes audio that is presented via an external device (e.g., speakers and/or headphones) that receives audio information from the HMD 405, the console 410, or both, and presents audio data based on the audio information. The HMD 405 may comprise one or more rigid bodies, which may be rigidly or non-rigidly coupled together. A rigid coupling between rigid bodies causes the coupled rigid bodies to act as a single rigid entity. In contrast, a non-rigid coupling between rigid bodies allows the rigid bodies to move relative to each other.

The HMD 405 includes an electronic display 420, an optics block 425, one or more position sensors 430, and an Inertial Measurement Unit (IMU) 435. The HMD 405 may further include a light field camera 440 described above in conjunction with FIGS. 1-3. The light field camera 440 may be an embodiment of the light field camera 100 shown in FIG. 1, and may comprises the component shown in FIG. 2A. Some embodiments of the HMD 405 have different components than those described in conjunction with FIG. 4. Additionally, the functionality provided by various components described in conjunction with FIG. 4 may be differently distributed among the components of the HMD 405 in other embodiments.

In some embodiments, the light field camera 440 captures images of an area surrounding the HMD 405, and determines depth information from the captured images as described below with regard to FIG. 5. The light field camera 440 can compute the depth information using the data, or the light field camera 440 can send this information to another device such as the console 410 that can determine the depth information using data from the light field camera 440. In alternate embodiments, the light field camera 440 is part of an eye tracking system, and generates eye tracking information as described in detail below with regard to FIG. 6.

The electronic display 420 displays 2D or 3D images to the user in accordance with data received from the console 410. In various embodiments, the electronic display 420 comprises a single electronic display or multiple electronic displays (e.g., a display for each eye of a user). Examples of the electronic display 420 include: a liquid crystal display (LCD), an organic light emitting diode (OLED) display, an active-matrix organic light-emitting diode display (AMO-LED), some other display, or some combination thereof.

The optics block 425 magnifies image light received from the electronic display 420, corrects optical errors associated with the image light, and presents the corrected image light to a user of the HMD 405. In various embodiments, the optics block 425 includes one or more optical elements. Example optical elements included in the optics block 425 include: an aperture, a Fresnel lens, a convex lens, a concave lens, a filter, a reflecting surface, or any other suitable optical element that affects image light. Moreover, the optics block 425 may include combinations of different optical elements. In some embodiments, one or more of the optical elements in the optics block 425 may have one or more coatings, such as partially reflective or anti-reflective coatings.

Magnification and focusing of the image light by the optics block 425 allows the electronic display 420 to be physically smaller, weigh less and consume less power than larger displays. Additionally, magnification may increase the field of view of the content presented by the electronic display 420. For example, the field of view of the displayed content is such that the displayed content is presented using almost all (e.g., approximately 110 degrees diagonal), and in some cases all, of the user's field of view. Additionally in some embodiments, the amount of magnification may be adjusted by adding or removing optical elements.

In some embodiments, the optics block 425 may be designed to correct one or more types of optical error. Examples of optical error include barrel or pincushion distortions, longitudinal chromatic aberrations, or transverse chromatic aberrations. Other types of optical errors may further include spherical aberrations, chromatic aberrations or errors due to the lens field curvature, astigmatisms, or any other type of optical error. In some embodiments, content provided to the electronic display 420 for display is pre-distorted, and the optics block 425 corrects the distortion when it receives image light from the electronic display 420 generated based on the content.

The IMU 435 is an electronic device that generates data indicating a position of the HMD 405 based on measurement signals received from one or more of the position sensors 430 and from depth information received from the light field camera 440. A position sensor 430 generates one or more measurement signals in response to motion of the HMD 405. Examples of position sensors 430 include: one or more accelerometers, one or more gyroscopes, one or more magnetometers, another suitable type of sensor that detects motion, a type of sensor used for error correction of the IMU 435, or some combination thereof. The position sensors 430 may be located external to the IMU 435, internal to the IMU 435, or some combination thereof.

Based on the one or more measurement signals from one or more position sensors 430, the IMU 435 generates data indicating an estimated current position of the HMD 405 relative to an initial position of the HMD 405. For example, the position sensors 430 include multiple accelerometers to measure translational motion (forward/back, up/down, left/right) and multiple gyroscopes to measure rotational motion (e.g., pitch, yaw, roll). In some embodiments, the IMU 435 rapidly samples the measurement signals and calculates the estimated current position of the HMD 405 from the sampled data. For example, the IMU 435 integrates the measurement signals received from the accelerometers over time to estimate a velocity vector and integrates the velocity vector over time to determine an estimated current position of a reference point on the HMD 405. Alternatively, the IMU 435 provides the sampled measurement signals to the console 410, which interprets the data to reduce error. The reference point is a point that may be used to describe the position of the HMD 405. The reference point may generally be defined as a point in space or a position related to the HMD's 405 orientation and position.

The IMU 435 receives one or more parameters from the console 410. The one or more parameters are used to maintain tracking of the HMD 405. Based on a received parameter, the IMU 435 may adjust one or more IMU parameters (e.g., sample rate). In some embodiments, certain parameters cause the IMU 435 to update an initial position of the reference point so it corresponds to a next position of the reference point. Updating the initial position of the reference point as the next calibrated position of the reference point helps reduce accumulated error associated with the current position estimated the IMU 435. The accumulated error, also referred to as drift error, causes the estimated position of the reference point to "drift" away from the actual position of the reference point over time. In some embodiments of the HMD 405, the IMU 435 may be a dedicated hardware component. In other embodiments, the IMU 435 may be a software component implemented in one or more processors.

The I/O interface 415 is a device that allows a user to send action requests and receive responses from the console 410. An action request is a request to perform a particular action. For example, an action request may be an instruction to start or end capture of image or video data or an instruction to perform a particular action within an application. The I/O interface 415 may include one or more input devices. Example input devices include: a keyboard, a mouse, a game controller, or any other suitable device for receiving action requests and communicating the action requests to the console 410. An action request received by the I/O interface 415 is communicated to the console 410, which performs an action corresponding to the action request. In some embodiments, the I/O interface 415 includes an IMU 440 that captures calibration data indicating an estimated position of the I/O interface 415 relative to an initial position of the I/O interface 415. In some embodiments, the I/O interface 415 may provide haptic feedback to the user in accordance with instructions received from the console 410. For example, haptic feedback is provided when an action request is received, or the console 410 communicates instructions to the I/O interface 415 causing the I/O interface 415 to generate haptic feedback when the console 410 performs an action.

The console 410 provides content to the HMD 405 for processing in accordance with information received from one or more of: the light field camera 440, the HMD 405, and the I/O interface 415. In the example shown in FIG. 1, the console 410 includes an application store 450, a tracking module 455 and an engine 545. Some embodiments of the console 410 have different modules or components than those described in conjunction with FIG. 4. Similarly, the functions further described below may be distributed among components of the console 410 in a different manner than described in conjunction with FIG. 4.

The application store 450 stores one or more applications for execution by the console 410. An application is a group of instructions, that when executed by a processor, generates content for presentation to the user. Content generated by an application may be in response to inputs received from the user via movement of the HMD 405 or the I/O interface 415. Examples of applications include: gaming applications, conferencing applications, video playback applications, or other suitable applications.

The tracking module 455 calibrates the system environment 400 using one or more calibration parameters and may adjust one or more calibration parameters to reduce error in determination of the position of the HMD 405 or of the I/O interface 415. For example, the tracking module 455 communicates a calibration parameter to the light field camera 440 to adjust the focus of the light field camera 440 to more accurately determine positions of SL elements captured by the light field camera 440. Calibration performed by the tracking module 455 also accounts for information received from the IMU 435 in the HMD 405 and/or an IMU 435 included in the I/O interface 415. Additionally, if tracking of the HMD 405 is lost (e.g., the light field camera 440 loses line of sight of at least a threshold number of SL elements), the tracking module 455 may re-calibrate some or all of the system environment 400.

The tracking module 455 tracks movements of the HMD 405 or of the I/O interface 415 using information from the light field camera 440, the one or more position sensors 430, the IMU 435 or some combination thereof. For example, the tracking module 455 determines a position of a reference point of the HMD 405 in a mapping of a local area based on information from the HMD 405. The tracking module 455 may also determine positions of the reference point of the HMD 405 or a reference point of the I/O interface 415 using data indicating a position of the HMD 405 from the IMU 435 or using data indicating a position of the I/O interface 415 from an IMU 435 included in the I/O interface 415, respectively. Additionally, in some embodiments, the tracking module 455 may use portions of data indicating a position or the HMD 405 from the IMU 435 as well as representations of the local area from the light field camera 440 to predict a future location of the HMD 405. The tracking module 455 provides the estimated or predicted future position of the HMD 405 or the I/O interface 415 to the engine 445.

The engine 445 generates a 3D mapping of the area surrounding the HMD 405 (i.e., the "local area") based on information received from the HMD 405. In some embodiments, the engine 445 determines depth information for the 3D mapping of the local area based on information received from the light field camera 440. The engine 445 may calculate depth information using images provided from the light field camera 440. For example, the engine 445 may calculate depth information of a scene in a field of view of the HMD 405 based on baseline separations and displacements between different images captured by an ASP array of the light field camera 440. The captured images provided from the light field camera 440 to the engine 445 represent focused images of one or more objects in the scene obtained based on different angular directions of light input into the ASP array that was reflected from the one or more objects.

The engine 445 also executes applications within the system environment 400 and receives position information, acceleration information, velocity information, predicted future positions, or some combination thereof, of the HMD 405 from the tracking module 455. Based on the received information, the engine 445 determines content to provide to the HMD 405 for presentation to the user. For example, if the received information indicates that the user has looked to the left, the engine 445 generates content for the HMD 405 that mirrors the user's movement in a virtual environment or in an environment augmenting the local area with additional content. Additionally, the engine 445 performs an action within an application executing on the console 410 in response to an action request received from the I/O interface 415 and provides feedback to the user that the action was performed. The provided feedback may be visual or audible feedback via the HMD 405 or haptic feedback via the I/O interface 415.

Applications of Light Field Camera with ASP that Includes Liquid Crystal Layer

Figure 5:
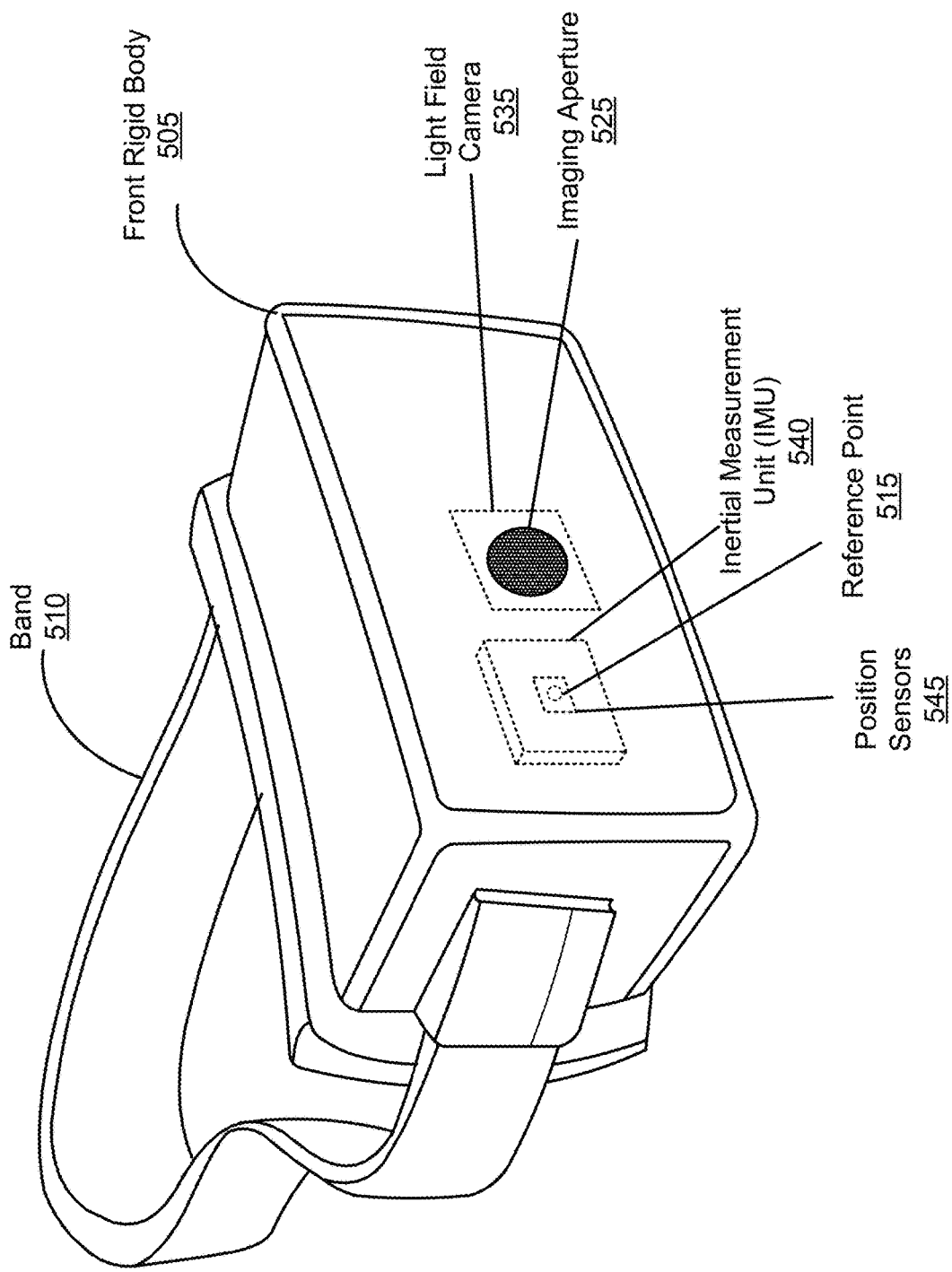
FIG. 5 is a diagram of a head-mounted display (HMD) that may include the light field camera in FIG. 1 for determining depth information of a scene, in accordance with an embodiment.

FIG. 5 is a diagram of a head-mounted display (HMD) 500 that may include a light field camera using an ASP array that includes a liquid crystal layer, which may be used for determining depth information of a scene, in accordance with an embodiment. The HMD 500 includes a front rigid body 505, a band 510, and a reference point 515. The front rigid body 505 includes an embodiment of a light field camera 535 with an imaging aperture 525. The light field camera 535 captures light from the local area through the imaging aperture 525. As described above, with respect to FIG. 3, based on signal intensities and angle information of the reflected structured light, the light field camera 535 may determine depth information of one or more objects located in a field of view of the HMD 500.

In one embodiment, the front rigid body 505 may further include one or more electronic display elements (not shown in FIG. 5), an IMU 540, one or more position sensors 545, and the reference point 515. In the illustrative embodiment shown by FIG. 5, the position sensors 545 are located within the IMU 540, and neither the IMU 540 nor the position sensors 545 are visible to a user. The IMU 540 is an electronic device that generates fast calibration data based on measurement signals received from one or more of the position sensors 545. A position sensor 545 generates one or more measurement signals in response to motion of the HMD 500. Examples of position sensors 545 include: one or more accelerometers, one or more gyroscopes, one or more magnetometers, another suitable type of sensor that detects motion, a type of sensor used for error correction of the IMU 540, or some combination thereof. The position sensors 545 may be located external to the IMU 540, internal to the IMU 540, or some combination thereof.

Figure 6:
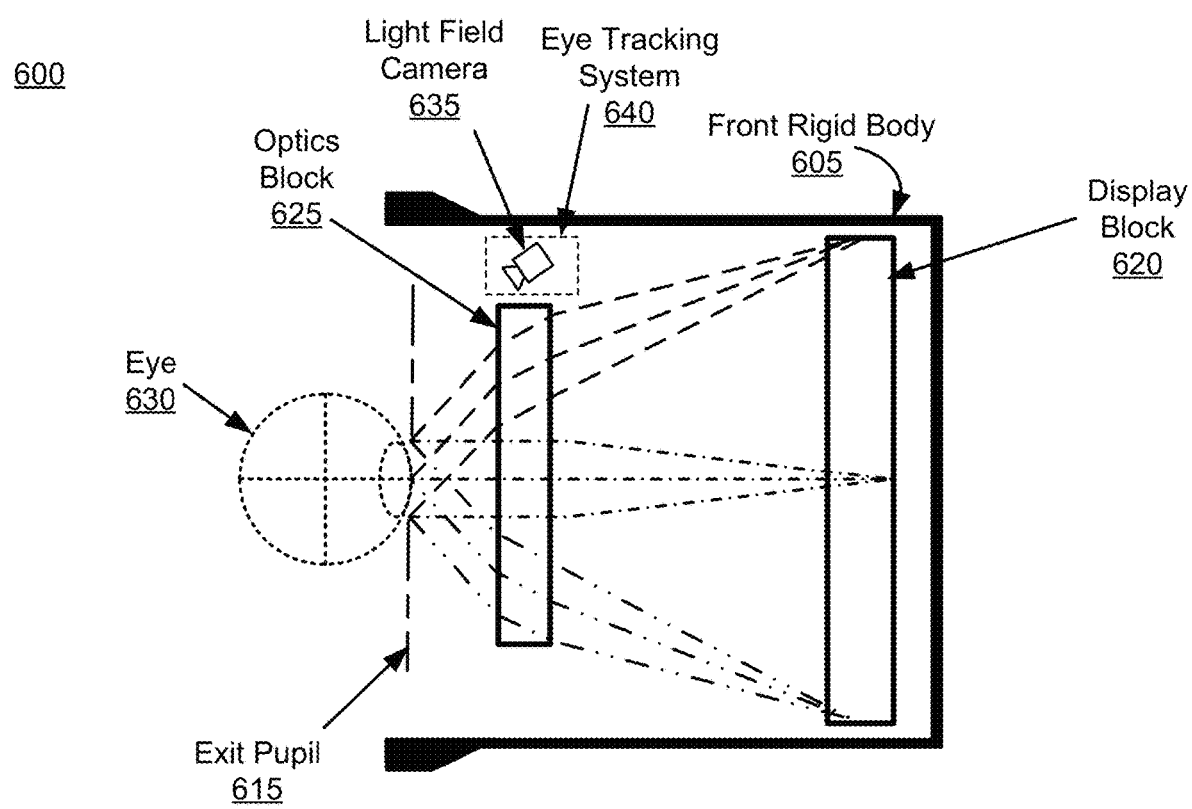
FIG. 6 is a cross section of a front rigid body of an HMD that may include the light field camera in FIG. 1 for eye tracking, in accordance with an embodiment.

FIG. 6 is a cross section 600 of a front rigid body 605 of an embodiment of an HMD, which may comprise a light field camera 635 including an ASP array. As shown in FIG. 6, the front rigid body 605 includes a display block 620 that provides focus adjusted image light to an exit pupil 615. The exit pupil 615 is the location of the front rigid body 605 where a user's eye 630 is positioned. For purposes of illustration, FIG. 6 shows a cross section 600 associated with a single eye 630, but another display block, separate from the display block 620, provides altered image light to another eye of the user.

The display block 620 generates image light. In some embodiments, the display block 620 includes an optical element that adjusts the focus of the generated image light. The display block 620 displays images to the user in accordance with data received from a console (not shown in FIG. 6). In various embodiments, the display block 620 may comprise a single electronic display or multiple electronic displays (e.g., a display for each eye of a user). Examples of the electronic display include: a liquid crystal display (LCD), an organic light emitting diode (OLED) display, an inorganic light emitting diode (ILED) display, an active-matrix organic light-emitting diode (AMOLED) display, a transparent organic light emitting diode (TOLED) display, some other display, a projector, or some combination thereof. The display block 620 may also include an aperture, a Fresnel lens, a convex lens, a concave lens, a diffractive element, a waveguide, a filter, a polarizer, a diffuser, a fiber taper, or any other suitable optical element that affects the image light emitted from the electronic display. In some embodiments, one or more of the display block optical elements may have one or more coatings, such as anti-reflective coatings.

The optics block 625 magnifies received light from the display block 620, corrects optical aberrations associated with the image light, and the corrected image light is presented to a user of the HMD. An optical element may be an aperture, a Fresnel lens, a refractive lens, a reflective surface, a diffractive element, a waveguide, a filter, or any other suitable optical element that affects the image light emitted from the display block 620. Moreover, the optics block 625 may include combinations of different optical elements. In some embodiments, one or more of the optical elements in the optics block 625 may have one or more coatings, such as anti-reflective coatings. Magnification of the image light by the optics block 625 allows elements of the display block 620 to be physically smaller, weigh less, and consume less power than larger displays. Additionally, magnification may increase a field of view of the displayed media. For example, the field of view of the displayed media is such that the displayed media is presented using almost all (e.g., 110 degrees diagonal), and in some cases all, of the user's field of view. In some embodiments, the optics block 625 is designed so its effective focal length is larger than the spacing to the display block 620, which magnifies the image light projected by the display block 620. Additionally, in some embodiments, the amount of magnification may be adjusted by adding or removing optical elements.

As shown in FIG. 6, the front rigid body 605 further includes an eye tracking system 640. The eye tracking system 640 includes a light field camera 635. The eye tracking system 640 tracks a position of the user's eye 630 using depth information provided by the light field camera 635. The light field camera 635 may be an embodiment of the light field camera 100 shown in FIG. 1. In some embodiments (not shown), the eye tracking system 640 may include, e.g., an infrared illumination source that illuminates the eye 630. The light field camera 635 captures light reflected from the eye 630 in one or more image frames. The light field camera 635 generates depth information from the captured image frames as described above in conjunction with FIG. 3. The eye tracking system 640 uses the depth information and, e.g., a virtual model of an eye to determine a position of the user's eye 630. The determined eye position may be provided to, e.g., a console (or a display of the HMD). The light field camera 635 is placed outside of a main line of sight of the user. For purposes of illustration, FIG. 6 shows a cross section 600 associated with a single eye 630, but another light field camera, separate from the light field camera 635 can be implemented at the front rigid body 605 and configured for tracking another user's eye.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A light field camera comprising:
   an angle sensitive pixel (ASP) array configured to capture one or more light field frames including intensity and angle information of light captured by the ASP array, the ASP array includes:
      an array of pixels, and
      a liquid crystal layer overlaying the array of pixels on a side of light entering the light field camera, the liquid crystal layer configured to:
         receive the light that entered the light field camera, and
         selectively propagate a portion of the received light toward the array of pixels based in part on (1) a plurality of different voltage levels applied to the liquid crystal layer and (2) a plurality of angles of incidence of the received light with the liquid crystal layer while applying the different voltage levels; and
   a controller configured to:
      control, during a time period, the plurality of different voltage levels applied to the liquid crystal layer, and
      individually adjust, during the time period based on the plurality of different voltage levels, each liquid crystal cell of the liquid crystal layer to control amounts of light at the angles propagated through the liquid crystal layer and captured by the array of pixels as a plurality of light field frames, wherein the array of pixels captures the light field frames during the time period.

2. The light field camera of claim 1, wherein the liquid crystal layer comprises a single liquid crystal cell that covers the array of pixels.

3. The light field camera of claim 2, wherein the controller is further configured to:
   control, at each time instant of the time period, a voltage level of the plurality of voltage levels applied to the liquid crystal cell; and
   adjust, based on the voltage level, the liquid crystal cell to control an amount of light at a corresponding angle of the plurality of angles propagated through the liquid crystal cell to the array of pixels, and
   wherein the array of pixels captures, at each time instant, a light field frame of the plurality of light field frames with information about intensities of light incident to the array of pixels at the corresponding angle and information about the corresponding angle.

4. The light field camera of claim 1, wherein the liquid crystal layer comprises a plurality of liquid crystal cells, and each liquid crystal cell overlays a different portion of the array of pixels.

5. The light field camera of claim 4, wherein the controller is further configured to:
   control, at each time instant of the time period, the plurality of voltage levels applied to the plurality of liquid crystal cells; and
   adjust, based on each voltage level, each liquid crystal cell to control an amount of light at a corresponding angle of the plurality of angles propagated through that liquid crystal cell to the different portion of the array of pixels, and
   wherein the array of pixels captures, at each time instant, a light field frame of the plurality of light field frames with information about intensities of light incident to different portions of the array of pixels at corresponding angles and information about the corresponding angles.

6. The light field camera of claim 1, wherein the liquid crystal layer comprises a plurality of liquid crystal cells, and each liquid crystal cell overlays a different pixel of the array of pixels.

7. The light field camera of claim 1, wherein:
   the array of pixels comprises a plurality of macro-pixels, each macro-pixel includes a two-dimensional grid of pixels,
   each pixel within the macro-pixel captures, at each time instant of the time period, information about an intensity of light incident to that pixel at a corresponding angle of the plurality of angles and information about the corresponding angle, and
   other pixel within other micro-pixel of the plurality of macro-pixels captures, at that time instant, information about another intensity of light incident to the other pixel at the same corresponding angle and information about the same corresponding angle.

8. The light field camera of claim 1, wherein the light field camera is part of a head-mounted display (HMD).

9. The light field camera of claim 8, wherein the controller is further configured to:
   determine depth information of one or more objects surrounding the HMD based on the captured light field frames; and
   provide the depth information of the one or more object to at least one of a console and a module of the HMD to generate content for presentation to a user.

10. The light field camera of claim 8, wherein the controller is further configured to:
    determine depth information based on the captured light field frames; and
    determine a position of an eye of a user wearing the HMD, based on the depth information and a virtual eye model.

11. The light field camera of claim 1, wherein the controller is further configured to:
    measure a bidirectional reflectance distribution function (BRDF) of an object, based on the captured light field frames; and determine depth information of the object based on the measured BRDF.

12. The light field camera of claim 1, wherein:
the array of pixels captures, at a first time instant, a first light field frame of the plurality of light field frames with information about first intensities of light incident to the array of pixels at a first angle and information about the first angle;
the array of pixels captures, at a second time instant, a second light field frame of the plurality of light field frames with information about second intensities of light incident to the array of pixels at a second angle and information about the second angle; and
the controller is further configured to determine depth information for one or more objects based on combining the first light field frame and the second light field frame.

13. The light field camera of claim 1, wherein the controller is further configured to:
control, at each time instant of the time period, a voltage level of the plurality of voltage levels applied to a liquid crystal cell of the liquid crystal layer; and
adjust, based on the voltage level, the liquid crystal cell to control an amount of light at an angle of a bandwidth of angles propagated through the liquid crystal cell to the array of pixels.

14. A method comprising:
capturing a plurality of light field frames including intensity and angle information of captured light, wherein capturing the light field frames comprises:
receiving, by a liquid crystal layer, light that entered a light field camera, the liquid crystal layer overlaying an array of pixels on a side of the light entering the light field camera,
controlling, during a time period, a plurality of different voltage levels applied to the liquid crystal layer, to selectively propagate a portion of the received light from the liquid crystal layer toward the array of pixels based in part on (1) the plurality of voltage levels and (2) a plurality of angles of incidence of the received light with the liquid crystal layer while applying the different voltage levels,
individually controlling, during the time period based on the plurality of different voltage levels, amounts of light at the angles propagated through each liquid crystal cell of the liquid crystal layer and captured by the array of pixels as the plurality of light field frames, and
capturing, by the array of pixels during the time period, the one or more light field frames;
determining depth information for one or more objects based on the captured light field frames; and
providing the depth information for further processing.

15. The method of claim 14, further comprising:
controlling, at each time instant of the time period, a voltage level of the plurality of voltage levels applied to a liquid crystal cell of the liquid crystal layer;
controlling, based on the voltage level, an amount of light at the corresponding angle propagated through the liquid crystal cell to the array of pixels; and
capturing, at each time instant, a light field frame of the plurality of light field frames with information about intensities of light incident to the array of pixels at a corresponding angle of the plurality of angles and information about the corresponding angle.

16. The method of claim 14, further comprising:
controlling, at each time instant of the time period, the plurality of voltage levels applied to a plurality of liquid crystal cells of the liquid crystal layer;
controlling, based on each voltage level, an amount of light at a corresponding angle of the plurality of angles propagated through that liquid crystal cell to a different portion of the array of pixels; and
capturing, at each time instant, a light field frame of the plurality of light field frames with information about intensities of light incident to different portions of the array of pixels at the corresponding angle and information about the corresponding angle.

17. The method of claim 14, further comprising:
determining the depth information of the one or more objects surrounding a head-mounted display (HMD); and
providing the depth information of the one or more object to at least one of a console and a module of the HMD to generate content for presentation to a user.

18. The method of claim 14, further comprising:
measuring a bidirectional reflectance distribution function (BRDF) of an object, based on the captured light field frames; and
determining the depth information of the object based on the measured BRDF.

19. The method of claim 14, further comprising:
capturing, at a first time instant, a first light field frame of the plurality of light field frames with information about first intensities of light incident to the array of pixels at a first angle and information about the first angle;
capturing, at a second time instant, a second light field frame of the plurality of light field frames with information about second intensities of light incident to the array of pixels at a second angle and information about the second angle; and
determining the depth information based on combining the first light field frame and the second light field frame.

20. A head-mounted display (HMD) comprising:
a display configured to emit image light;
an angle sensitive pixel (ASP) array configured to capture a plurality of light field frames including intensity and angle information of light captured by the ASP array, the ASP array includes:
an array of pixels, and
a liquid crystal layer overlaying the array of pixels on a side of light entering the light field camera, the liquid crystal layer configured to:
receive the light that entered the light field camera, and
selectively propagate a portion of the received light toward the array of pixels based in part on (1) a plurality of different voltage levels applied to the liquid crystal layer and (2) a plurality of angles of incidence of the received light with the liquid crystal layer while applying the different voltage levels;
a controller configured to:
control, during a time period, the plurality of different voltage levels applied to the liquid crystal layer,
individually adjust, during the time period based on the plurality of different voltage levels, each liquid crystal cell of the liquid crystal layer to control amounts of light at the angles propagated through the liquid crystal layer and captured by the array of pixels as the plurality of light field frames, wherein the array of pixels captures the light field frames during the time period, and determine depth information of one or more objects surrounding the HMD, based on the captured light field frames; and an optical assembly configured to direct the image light to an exit pupil of the HMD corresponding to a location of a user's eye, the image light comprising the determined depth information.

* * * * *

UNITED STATES PATENT AND TRADEMARK OFFICE
CERTIFICATE OF CORRECTION

PATENT NO. : 10,712,572 B1
APPLICATION NO. : 15/670532
DATED : July 14, 2020
INVENTOR(S) : Liu et al.

Page 1 of 1

It is certified that error appears in the above-identified patent and that said Letters Patent is hereby corrected as shown below:

In the Claims

In Column 17, in Claim 14, Line 52, after "the" delete "one or more".

Signed and Sealed this
Fifteenth Day of December, 2020

Andrei Iancu
*Director of the United States Patent and Trademark Office*